UNITED STATES PATENT OFFICE.

CHARLES H. REANEY, OF WASHINGTON, DISTRICT OF COLUMBIA.

PAINT.

SPECIFICATION forming part of Letters Patent No. 474,693, dated May 10, 1892.

Application filed October 19, 1891. Serial No. 409,136. (No specimens.)

*To all whom it may concern:*

Be it known that I, CHARLES H. REANEY, a citizen of the United States, residing at Washington, in the District of Columbia, have invented certain new and useful Improvements in Paints; and I do hereby declare the following to be a full, clear, and exact description of the invention, such as will enable others skilled in the art to which it appertains to make and use the same.

My invention relates to paints which are specially adapted for use in connection with ships' bottoms, roofing, and the like where iron, steel, or other metal is employed, and for brick, stone-work, and other material which is exposed to the action of water or the weather.

The object of my invention is to produce a paint composed of a mixture of certain ingredients which will co-operate to effect the best and most lasting results, said ingredients and their proportions being as follows: zinc oxide, five pounds; red lead, seven pounds; drop ivory-black, two and one-fourth pounds; pulverized slate, two ounces, the above to be thoroughly mixed and to have added thereto raw linseed-oil, two pints; spirits of turpentine, one pint; oxide drier, one and one-half gills; bisulphide of carbon, three gills; pure rubber, one-fourth pound. Zinc oxide and red lead are employed for their well-known property of resisting moisture, drop ivory-black for its staying property, pulverized slate for the property of protecting metals from corrosion, and pure rubber, which is dissolved in the bisulphide of carbon, for adding to the cohesiveness and protective qualities of the paint. The linseed-oil and turpentine are the vehicle, and the drier should be an oxide formed with a base of lead.

By the use of the above-described paint a firm water-proof and lasting coat can be applied which will effectually prevent corrosion and decay.

I claim—

The herein-described paint, consisting of zinc oxide, red lead, drop ivory-black, pulverized slate, raw linseed-oil, spirits of turpentine, oxide drier, bisulphide of carbon, and pure rubber in the proportions specified.

In testimony whereof I affix my signature in presence of two witnesses.

CHARLES H. REANEY.

Witnesses:
J. W. EVERLY,
O. T. BEAUMONT.